United States Patent
Tachibanada et al.

(10) Patent No.: US 9,140,358 B2
(45) Date of Patent: Sep. 22, 2015

(54) AUTOMATIC TRANSMISSION

(71) Applicant: HONDA MOTOR CO., LTD., Tokyo (JP)

(72) Inventors: Yuya Tachibanada, Wako (JP); Yutaka Ishikawa, Wako (JP); Soichi Sugino, Wako (JP); Naomichi Tonokura, Wako (JP); Nobuyuki Watanabe, Wako (JP); Takashi Ohtani, Wako (JP); Mitsuo Ueda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/248,293

(22) Filed: Apr. 8, 2014

(65) Prior Publication Data

US 2014/0303860 A1 Oct. 9, 2014

(30) Foreign Application Priority Data

Apr. 9, 2013 (JP) .................................. 2013-081640

(51) Int. Cl.
*F16H 61/68* (2006.01)
(52) U.S. Cl.
CPC ............ *F16H 61/68* (2013.01); *F16H 2710/04* (2013.01)
(58) Field of Classification Search
CPC ............................. F16H 61/68; F16H 2710/04
See application file for complete search history.

(56) References Cited

U.S. PATENT DOCUMENTS

| | | | |
|---|---|---|---|
| 2008/0071449 A1* | 3/2008 | Kondo et al. | 701/51 |
| 2013/0109533 A1* | 5/2013 | Matsubara et al. | 477/80 |
| 2014/0165765 A1* | 6/2014 | Fontana | 74/473.22 |

FOREIGN PATENT DOCUMENTS

JP 2012-097864 5/2012

* cited by examiner

*Primary Examiner* — Edwin A Young
(74) *Attorney, Agent, or Firm* — Mori & Ward, LLP

(57) ABSTRACT

An automatic transmission includes an input member, a planetary gear set, a plurality of engagement mechanisms, an output member, a shift position detecting unit, an input rotational speed detecting unit, a control unit, and a switching mechanism. When a shift position is changed from a forward drive range to a reverse drive range, the control unit performs a reverse preparation mode in which a rotational speed of an element to be fixed by the switching mechanism is lower than or equal to a predetermined speed by setting an engagement mechanism in one of a connection mode and a fixed mode. Upon performing the reverse preparation mode, the control unit engages the engagement mechanism that connects the element fixed by the switching mechanism to the input member and, thereafter, engages the engagement mechanism that makes the rotational speed of the input member lower than or equal to the predetermined speed.

6 Claims, 8 Drawing Sheets

FIG. 4

| | B1 | B2 | B3 | B4 | C1 | C2 | C3 | TRANSMISSION GEAR RATIO | COMMON RATIO |
|---|---|---|---|---|---|---|---|---|---|
| Rvs | L | | ○ | | | ○ | | 4.008 | |
| 1st | R/L | ○ | ○ | | | | | | 5.233 | 1.554 |
| 2nd | R | ○ | ○ | | | | | ○ | 3.367 | 1.465 |
| 3rd | R | ○ | ○ | | | | ○ | | 2.298 | 1.348 |
| 4th | R | ○ | | | | ○ | ○ | 1.705 | 1.251 |
| 5th | R | ○ | | | ○ | ○ | | 1.363 | 1.363 |
| 6th | R | | ○ | | ○ | ○ | | 1.000 | 1.273 |
| 7th | R | | ○ | | ○ | | ○ | 0.786 | 1.196 |
| 8th | R | | ○ | | ○ | | ○ | 0.657 | 1.126 |
| 9th | R | | | ○ | ○ | | | 0.584 | 1.120 |
| 10th | R | | | ○ | ○ | | ○ | 0.520 | |

AUTOMATIC TRANSMISSION

CROSS-REFERENCE TO RELATED APPLICATIONS

The present application claims priority under 35 U.S.C. §119 to Japanese Patent Application No. 2013-081640, filed Apr. 9, 2013, entitled "Automatic Transmission." The contents of this application are incorporated herein by reference in their entirety.

BACKGROUND

1. Field

The present disclosure relates to an automatic transmission.

2. Description of the Related Art

An automatic transmission capable of providing 8-forward-speed and 1-reverse-speed transmission using a four planetary gear sets and six engagement mechanisms formed from clutches and brakes has been developed (refer to, for example, Japanese Unexamined Patent Application Publication No. 2012-97864).

The automatic transmission described in Japanese Unexamined Patent Application Publication No. 2012-97864 includes an input shaft rotatably supported by a housing and an output member formed from an output gear disposed so as to be concentric with the input shaft inside the housing. Rotation of the output member is transferred to the right and left drive wheels of a vehicle via a differential gear or a propeller shaft.

First to fourth planetary gear sets are disposed in the housing so as to be concentric with one another. The first planetary gear set is a single-pinion planetary gear set including the following three elements: a first sun gear, a first ring gear, and a first carrier that supports a first pinion meshed with the first sun gear and the first ring gear so that the first pinion is rotatable about its axis and is revolvable around the first sun gear. When the carrier is fixed and if the sun gear is rotated, the ring gear rotates in opposite direction to the sun gear rotation. Accordingly, a single-pinion planetary gear set is also referred to as a "minus planetary gear set" or a "negative planetary gear set". Note that when the ring gear is fixed and if the sun gear is rotated, the carrier and the sun gear rotate in the same direction.

Referring to a collinear diagram (a diagram indicating relative rotational speed ratios among three elements, that is, a ring gear, a carrier, and the ring gear, in the form of straight lines (speed lines)) of the first planetary gear set, if first, second, and third elements are sequentially disposed from one side of the collinear diagram, the first element represents the first sun gear, the second element represents the first carrier, and the third element represents the first ring gear.

Like the first planetary gear set, the second planetary gear set is a single-pinion planetary gear set including the following three elements: a second sun gear, a second ring gear, and a second carrier that supports a second pinion meshed with the second sun gear and the second ring gear so that the second pinion is rotatable about its axis and is revolvable around the second sun gear. If the three elements of the second planetary gear set are referred to as a fourth element, a fifth element, and a sixth element sequentially disposed from one side of the collinear diagram of the second planetary gear set, the fourth element represents the second ring gear, the fifth element represents the second carrier, and the sixth element represents the second sun gear.

Like the first planetary gear set, the third planetary gear set is a single-pinion planetary gear set including the following three elements: a third sun gear, a third ring gear, and a third carrier that supports a third pinion meshed with the third sun gear and the third ring gear so that the third pinion is rotatable about its axis and is revolvable around the third sun gear. If the three elements of the third planetary gear set are referred to as a seventh element, an eighth element, and a ninth element sequentially disposed from one side of the collinear diagram of the third planetary gear set, the seventh element represents the third sun gear, the eighth element represents the third carrier, and the ninth element represents the third ring gear.

Like the first planetary gear set, the fourth planetary gear set is a single-pinion planetary gear set including the following three elements: a fourth sun gear, a fourth ring gear, and a fourth carrier that supports a fourth pinion meshed with the fourth sun gear and the fourth ring gear so that the fourth pinion is rotatable about its axis and is revolvable around the fourth sun gear. If the three elements of the fourth planetary gear set are referred to as a tenth element, an eleventh element, and a twelfth element sequentially disposed from one side of the collinear diagram of the fourth planetary gear set, the tenth element represents the fourth ring gear, the eleventh element represents the fourth carrier, and the twelfth element represents the fourth sun gear.

The first sun gear (the first element) of the first planetary gear set is connected to the input shaft. In addition, the fourth ring gear (the tenth element) of the fourth planetary gear set is connected to the output member.

In addition, the first carrier (the second element) of the first planetary gear set is connected to the second carrier (the fifth element) of the second planetary gear set and the third ring gear (the ninth element) of the third planetary gear set and, thus, a first connected member (the second element, the fifth element, the ninth element) is formed. Furthermore, the first ring gear (the third element) of the first planetary gear set is connected to the fourth sun gear (the twelfth element) of the fourth planetary gear set and, thus, a second connected member (the third element, the twelfth element) is formed. Still furthermore, the third carrier (the eighth element) of the third planetary gear set is connected to the fourth carrier (the eleventh element) of the fourth planetary gear set and, thus, a third connected member (the eighth element, the eleventh element) is formed.

In addition, the automatic transmission described in Japanese Unexamined Patent Application Publication No. 2012-97864 includes six engagement mechanisms formed from three clutches, that is, first to third clutches, and three brakes, that is, first to third brakes.

The first clutch is a wet multiple disc clutch. The first clutch is configured so as to be switchable between a connection mode in which the first sun gear (the first element) of the first planetary gear set is connected to the third connected member (the eighth element, the eleventh element) and a release mode in which the first sun gear is disconnected from the third connected member. The second clutch is also a wet multiple disc clutch. The second clutch is configured so as to be switchable between a connection mode in which the first sun gear (the first element) of the first planetary gear set is connected to the second ring gear (the fourth element) of the second planetary gear set and a release mode in which the first sun gear is disconnected from the second ring gear.

The third clutch is a wet multiple disc clutch. The third clutch is configured so as to be switchable between a connection mode in which the second sun gear (the sixth element) of the second planetary gear set is connected to the second connected member (the third element, the twelfth element)

and a release mode in which the second sun gear is disconnected from the second connected member. The first brake is a wet multiple disc brake. The first brake is configured so as to be switchable between a fixed mode in which the third connected member (the eighth element, the eleventh element) is fixed to the housing and a release mode in which the third connected member is unfixed from the housing.

A second brake is a wet multiple disc brake. The second brake is configured so as to be switchable between a fixed mode in which the third sun gear (the seventh element) of the third planetary gear set is fixed to the housing and a release mode in which the third sun gear is unfixed from the housing. A third brake is a wet multiple disc brake. The third brake is configured so as to be switchable between a fixed mode in which the second sun gear (the sixth element) of the second planetary gear set is fixed to the housing and a release mode in which the second sun gear is unfixed from the housing.

According to the automatic transmission described in Japanese Unexamined Patent Application Publication No. 2012-97864, by setting each of the first brake, the second brake, and the third brake in a fixed mode, a first forward speed ratio is established. By setting the second brake and the third brake in the fixed mode and setting the third clutch in the connection mode, a second forward speed ratio is established. By setting the second brake and the third brake in the fixed mode and setting the second clutch in the connection mode, a third forward speed ratio is established. By setting the second brake in the fixed mode and setting the second clutch and the third clutch in the connection mode, a fourth forward speed ratio is established.

By setting the second brake in the fixed mode and setting the first clutch and the second clutch in a connection mode, a fifth forward speed ratio is established. By setting the first to third clutches in the connection mode, a sixth forward speed ratio is established. By setting the third brake in the fixed mode and setting the first clutch and the second clutch in the connection mode, a seventh forward speed ratio is established. By setting the third brake in a fixed mode and setting the first clutch and the third clutch in the connection mode, an eighth forward speed ratio is established. By setting the first brake and the third brake in the fixed mode and setting the second clutch in the connection mode, a reverse speed ratio is established.

SUMMARY

According to one aspect of the present invention, an automatic transmission includes an input member, a planetary gear set, a plurality of engagement mechanisms, an output member, a shift position detecting unit, an input rotational speed detecting unit, a control unit, and a switching mechanism. The input member is disposed in a housing to receive power transferred from a drive source. The planetary gear set includes a plurality of elements rotatable in the housing. The plurality of engagement mechanisms are each switchable between a connection mode in which the elements are connected to each other and a fixed mode in which one of the elements is fixed to the housing. The shift position detecting unit is configured to detect a shift position. The input rotational speed detecting unit is configured to detect the rotational speed of the input member. The control unit is configured to receive information regarding the rotational speed detected by the input rotational speed detecting unit and information regarding the shift position detected by the shift position detecting unit and control the engagement mechanisms. The rotational speed of the input member is changed into one of a plurality of speeds. The rotation of the input member is output from the output member. The switching mechanism is configured to switch between a reverse rotation prevention mode in which forward rotation of one of the elements representing rotation in a direction to move a vehicle forward is allowed and reverse rotation of the element representing rotation in a direction to move the vehicle backward is prevented and a fixed mode in which the element is fixed to the housing. The control unit sets the switching mechanism in the reverse rotation prevention mode when a shift position is set to a forward drive range and sets the switching mechanism in the fixed mode when the shift position is set to a reverse drive range. When the shift position is changed from the forward drive range to the reverse drive range, the control unit performs a reverse preparation mode in which the rotational speed of the element to be fixed by the switching mechanism is lower than or equal to a predetermined speed by setting the engagement mechanism in one of the connection mode and the fixed mode. Upon performing the reverse preparation mode, the control unit engages the engagement mechanism that connects the element fixed by the switching mechanism to the input member and, thereafter, engages the engagement mechanism that makes the rotational speed of the input member lower than or equal to the predetermined speed.

According to another aspect of the present invention, an automatic transmission includes an input member, a planetary gear set, a plurality of engagement mechanisms, an output member, a shift position detecting unit, an input rotational speed detecting unit, a control unit, and a switching mechanism. The input member is disposed in a housing to receive power transferred from a drive source. The planetary gear set includes a plurality of elements rotatable in the housing. The plurality of engagement mechanisms are each switchable between a connection mode in which the elements are connected to each other and a fixed mode in which one of the elements is fixed to the housing. The shift position detecting unit is configured to detect a shift position. The input rotational speed detecting unit is configured to detect a rotational speed of the input member. The control unit is configured to receive information regarding the rotational speed detected by the input rotational speed detecting unit and information regarding the shift position detected by the shift position detecting unit and control the engagement mechanisms. The rotational speed of the input member is changed into one of a plurality of speeds. The rotation of the input member is output from the output member. The switching mechanism is configured to switch between a reverse rotation prevention mode in which forward rotation of one of the elements representing rotation in a direction to move a vehicle forward is allowed and reverse rotation of the element representing rotation in a direction to move the vehicle backward is prevented and a fixed mode in which the element is fixed to the housing. The control unit sets the switching mechanism in the reverse rotation prevention mode when the shift position is in a forward drive range and sets the switching mechanism in the fixed mode when the shift position is in a reverse drive range. When the shift position is changed from the forward drive range to the reverse drive range, the control unit is capable of performing a reverse preparation mode in which a rotational speed of the element to be fixed by the switching mechanism is lower than or equal to a predetermined speed by setting the engagement mechanism in one of the connection mode and the fixed mode. Upon performing the reverse preparation mode, the control unit engages the engagement mechanism that makes the rotational speed of the input member lower than or equal to the predetermined speed and, thereafter, engages the engagement mechanism that connects the element fixed by the switching mechanism to the input member.

According to further aspect of the present invention, an automatic transmission includes an input member, a planetary gear set, a plurality of engagement mechanisms, an output member, a shift position detector, an input rotational speed detector, a controller, and a switching mechanism. The input member is disposed in a housing to receive power transferred from a drive source. The planetary gear set includes a plurality of elements rotatable in the housing. The plurality of engagement mechanisms are each to be switched between a connection mode in which the plurality of elements are connected to each other and a fixed mode in which one of the plurality of elements is fixed to the housing. A rotation of the input member is to be output from the output member. The shift position detector is configured to detect a shift position. The input rotational speed detector is configured to detect a rotational speed of the input member. The controller is configured to receive information regarding the rotational speed detected by the input rotational speed detector and information regarding the shift position detected by the shift position detector and configured to control the plurality of engagement mechanisms. The rotational speed of the input member is changed into one of a plurality of speeds. The switching mechanism is configured to switch between a reverse rotation prevention mode in which a forward rotation of one of the elements is allowed and a reverse rotation of the one of the elements is prevented and a fixed mode in which the one of the elements is fixed to the housing. The forward rotation represents rotation in a direction to move a vehicle forward. The reverse rotation represents rotation in a direction to move the vehicle backward. The controller is configured to set the switching mechanism in the reverse rotation prevention mode when a shift position is set to a forward drive range and configured to set the switching mechanism in the fixed mode when the shift position is set to a reverse drive range. The controller is configured to perform a reverse preparation mode in which the rotational speed of the element to be fixed by the switching mechanism is lower than or equal to a predetermined speed by setting the engagement mechanism in one of the connection mode and the fixed mode, when the shift position is changed from the forward drive range to the reverse drive range. Upon performing the reverse preparation mode, the controller is configured to engage the engagement mechanism that connects the element fixed by the switching mechanism to the input member and, thereafter, engage the engagement mechanism that makes the rotational speed of the input member lower than or equal to the predetermined speed.

According to the other aspect of the present invention, an automatic transmission includes an input member, a planetary gear set, a plurality of engagement mechanisms, an output member, a shift position detector, an input rotational speed detector, a controller, and a switching mechanism. The input member is disposed in a housing to receive power transferred from a drive source. The planetary gear set includes a plurality of elements rotatable in the housing. The plurality of engagement mechanisms are each to be switched between a connection mode in which the plurality of elements are connected to each other and a fixed mode in which one of the plurality of elements is fixed to the housing. A rotation of the input member is to be output from the output member. The shift position detector is configured to detect a shift position. The input rotational speed detector is configured to detect a rotational speed of the input member. The controller is configured to receive information regarding the rotational speed detected by the input rotational speed detector and information regarding the shift position detected by the shift position detector and configured to control the plurality of engagement mechanisms. The rotational speed of the input member is changed into one of a plurality of speeds. The switching mechanism is configured to switch between a reverse rotation prevention mode in which a forward rotation of one of the elements is allowed and a reverse rotation of the one of the elements is prevented and a fixed mode in which the one of the elements is fixed to the housing. The forward rotation represents rotation in a direction to move a vehicle forward. The reverse rotation represents rotation in a direction to move the vehicle backward. The controller is configured to set the switching mechanism in the reverse rotation prevention mode when the shift position is in a forward drive range and configured to set the switching mechanism in the fixed mode when the shift position is in a reverse drive range. The controller is configured to perform a reverse preparation mode in which the rotational speed of the element to be fixed by the switching mechanism is lower than or equal to a predetermined speed by setting the engagement mechanism in one of the connection mode and the fixed mode, when the shift position is changed from the forward drive range to the reverse drive range. Upon performing the reverse preparation mode, the controller is configured to engage the engagement mechanism that makes the rotational speed of the input member lower than or equal to the predetermined speed and, thereafter, engage the engagement mechanism that connects the element fixed by the switching mechanism to the input member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 illustrates all the modes of engagement mechanisms in the transmission gear ratios of the automatic transmission according to the exemplary embodiment.

DESCRIPTION OF THE EMBODIMENTS

Figure 1:
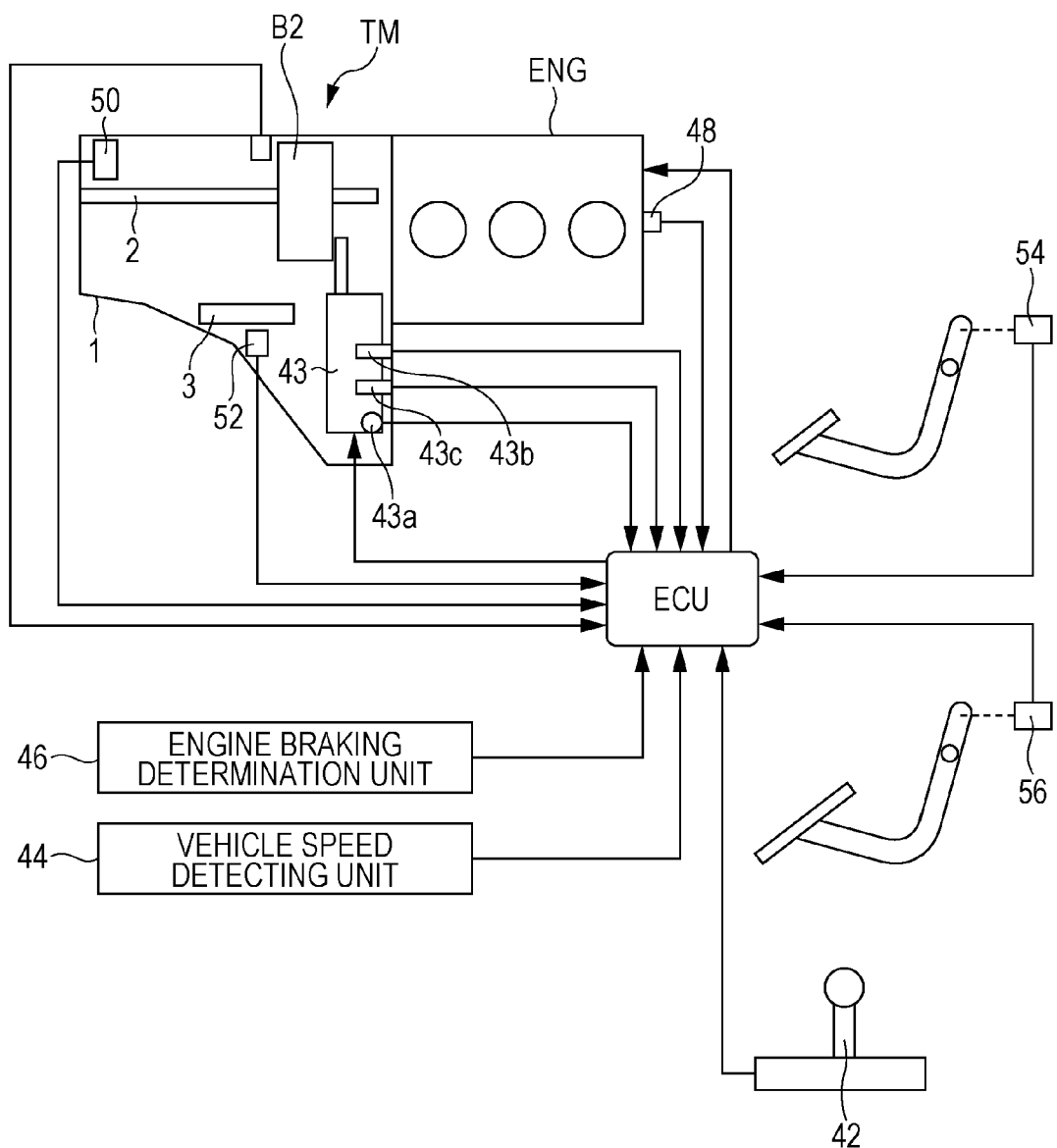
FIG. 1 is a schematic illustration of an automatic transmission according to an exemplary embodiment of the present disclosure.

The embodiments will now be described with reference to the accompanying drawings, wherein like reference numerals designate corresponding or identical elements throughout the various drawings.

Figure 2:
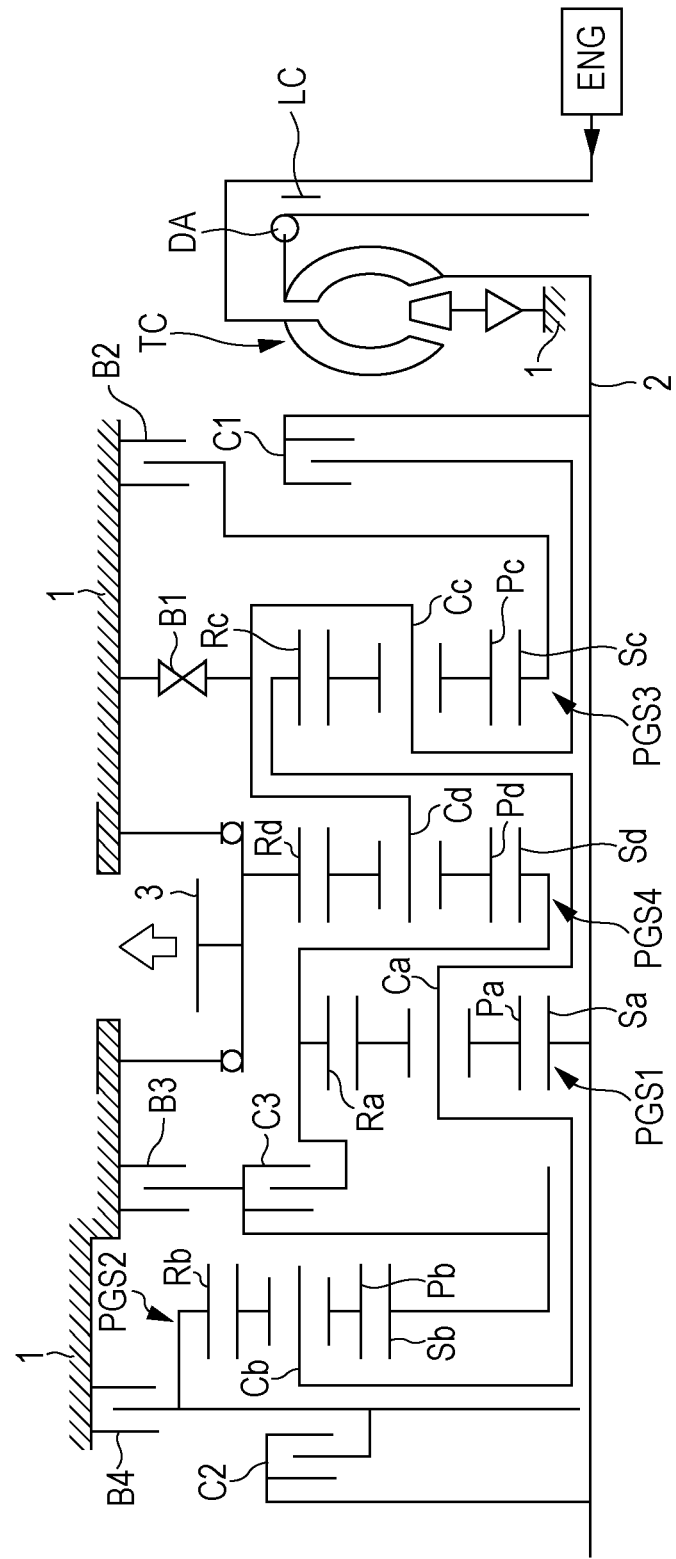
FIG. 2 is a skeleton diagram of the automatic transmission according to the exemplary embodiment of the present disclosure.

FIGS. 1 and 2 illustrate an automatic transmission TM according to an exemplary embodiment of the present disclosure. The automatic transmission TM includes an input shaft 2 rotatably supported in a housing 1 and an output member 3 formed from an output gear disposed so as to be concentric with the input shaft 2. The input shaft 2 serves as an input member. A driving force output from a drive source ENG, such as an internal combustion engine (an engine), is transferred to the input shaft 2 via a torque converter TC including a lockup clutch LC and a damper DA.

The rotation of the output member 3 is transferred to the right and left drive wheels of a vehicle via a differential gear or a propeller shaft (neither is illustrated). Note that instead of the torque converter TC, a single disc start clutch or a multiple disc start clutch that is frictionally engageable may be employed.

In the housing 1, first to fourth planetary gear sets PGS1 to PGS4 are arranged so as to be concentric with the input shaft 2. The first planetary gear set PGS1 is a single-pinion planetary gear set including a sun gear Sa, a ring gear Ra, and a carrier Ca that supports a pinion Pa meshed with the sun gear Sa and the ring gear Ra so that the pinion Pa is rotatable about its axis and is revolvable around the sun gear Sa. When the carrier is fixed and if the sun gear is rotated, the ring gear rotates in opposite direction to the sun gear rotation. Accordingly, a single-pinion planetary gear set is also referred to as a "minus planetary gear set" or a "negative planetary gear set". Note that when the ring gear is fixed and if the sun gear is rotated, the carrier and the sun gear rotate in the same direction.

Figure 3:
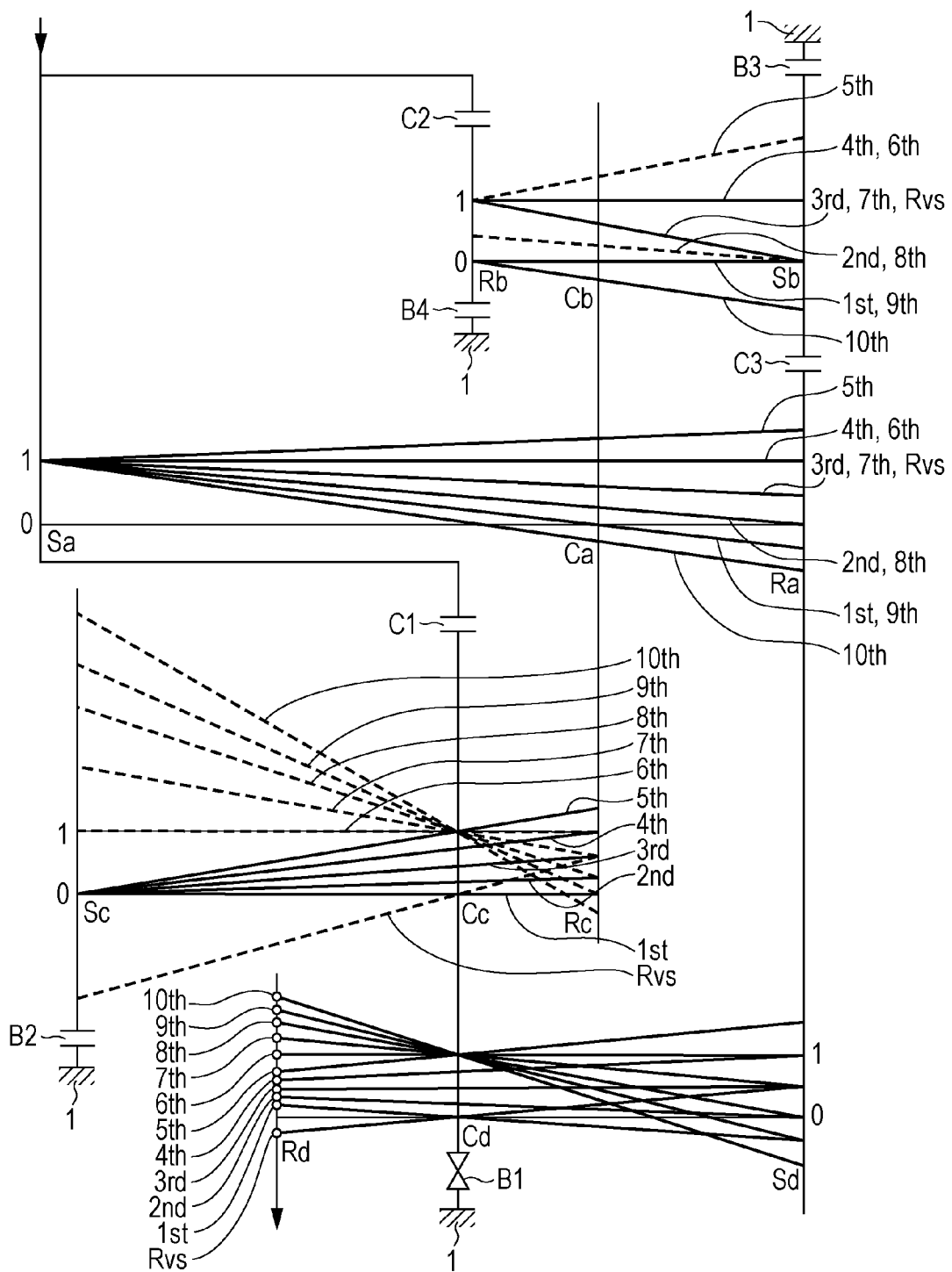
FIG. 3 is a collinear diagram of the automatic transmission according to the exemplary embodiment.

FIG. 3 is a collinear diagram of the first to fourth planetary gear sets PGS1 to PGS4. As used herein, the term "collinear diagram" is defined as a diagram indicating relative rotational speed ratios among three elements, that is, a ring gear, a carrier, and the ring gear, in the form of straight lines (speed lines)). In the collinear diagram, the three elements are arranged at intervals corresponding to the gear ratios (the number of teeth of the ring gear/the number of teeth of the sun gear).

Referring to the collinear diagram of the first planetary gear set PGS1 illustrated in a second section from the top of FIG. 3, let three elements Sa, Ca, and Ra of the first planetary gear set PGS1 denote a first element, a second element, and a third element arranged from the left at intervals corresponding to the gear ratios of the collinear diagram (the number of teeth of the ring gear/the number of teeth of the sun gear). Then, the first element corresponds to the sun gear Sa, the second element corresponds to the carrier Ca, and the third element corresponds to the ring gear Ra.

Herein, let h denote the gear ratio of the first planetary gear set PGS1. Then, the ratio of the distance between the sun gear Sa and the carrier Ca to the distance between the carrier Ca and the ring gear Ra is set to h:1. Note that in the collinear diagram, the lower horizontal line and the upper horizontal line (a line that overlaps the line indicated by "4th" and "6th") indicate that the rotational speeds are "0" and "1" (i.e., the rotational speed is the same as the rotational speed of the input shaft 2), respectively.

Similarly, the second planetary gear set PGS2 is a single-pinion planetary gear set including a sun gear Sb, a ring gear Rb, and a carrier Cb that supports a pinion Pb meshed with the sun gear Sb and the ring gear Rb so that the pinion Pb is rotatable about its axis and is revolvable around the sun gear Sb.

Referring to the collinear diagram of the second planetary gear set PGS2 illustrated in a first section (the topmost section) of FIG. 3, let three elements Rb, Cb, and Sb of the second planetary gear set PGS2 denote a fourth element, a fifth element, and a sixth element arranged from the left at intervals corresponding to the gear ratios. Then, the fourth element corresponds to the ring gear Rb, the fifth element corresponds to the carrier Cb, and the sixth element corresponds to the sun gear Sb. The ratio of the distance between the sun gear Sb and the carrier Cb to the distance between the carrier Cb and the ring gear Rb is set to i:1, where "i" denotes the gear ratio of the second planetary gear set PGS2.

Similarly, the third planetary gear set PGS3 is a single-pinion planetary gear set including a sun gear Sc, a ring gear Rc, and a carrier Cc that supports a pinion Pc meshed with the sun gear Sc and the ring gear Rc so that the pinion Pc is rotatable about its axis and is revolvable around the sun gear Sc.

Referring to the collinear diagram of the third planetary gear set PGS3 illustrated in a third section from the top of FIG. 3, let three elements Sc, Cc, and Rc of the third planetary gear set PGS3 denote a seventh element, an eighth element, and a ninth element arranged from the left at intervals corresponding to the gear ratios. Then, the seventh element corresponds to the sun gear Sc, the eighth element corresponds to the carrier Cc, and the ninth element corresponds to the ring gear Rc. The ratio of the distance between the sun gear Sc and the carrier Cc to the distance between the carrier Cc and the ring gear Rc is set to j:1, where "j" denotes the gear ratio of the third planetary gear set PGS3.

Similarly, the fourth planetary gear set PGS4 is a single-pinion planetary gear set including a sun gear Sd, a ring gear Rd, and a carrier Cd that supports a pinion Pd meshed with the sun gear Sd and the ring gear Rd so that the pinion Pd is rotatable about its axis and is revolvable around the sun gear Sd.

Referring to the collinear diagram of the fourth planetary gear set PGS4 illustrated in a fourth section (the lowermost section) from the top of FIG. 3, let three elements Sd, Cd, and Rd of the fourth planetary gear set PGS4 denote a tenth element, an eleventh element, and a twelfth element arranged from the left at intervals corresponding to the gear ratios. Then, the tenth element corresponds to the ring gear Rd, the eleventh element corresponds to the carrier Cd, and the twelfth element corresponds to the sun gear Sd. The ratio of the distance between the sun gear Sd and the carrier Cd to the distance between the carrier Cd and the ring gear Rd is set to k:1, where "k" denotes the gear ratio of the fourth planetary gear set PGS4.

The sun gear Sa of the first planetary gear set PGS1 (the first element) is connected to the input shaft 2. In addition, the ring gear Rd of the fourth planetary gear set PGS4 (the tenth element) is connected to the output member 3 formed from the output gear.

In addition, the carrier Ca (the second element) of the first planetary gear set PGS1 is connected to the carrier Cb (the fifth element) of the second planetary gear set PGS2 and the ring gear Rc (the ninth element) of the third planetary gear set PGS3 and, thus, a first connected member Ca-Cb-Rc is formed. In addition, the ring gear Ra (the third element) of the first planetary gear set PGS1 is connected to the sun gear Sd (the twelfth element) of the fourth planetary gear set PGS4 and, thus, a second connected member Ra-Sd is formed. Furthermore, the carrier Cc (the eighth element) of the third planetary gear set PGS3 is connected to the carrier Cd (the eleventh element) of the fourth planetary gear set PGS4 and, thus, a third connected member Cc-Cd is formed.

Still furthermore, according to the present exemplary embodiment, the automatic transmission TM includes a switching mechanism formed from the first brake B1 and six engagement mechanisms formed from three clutches, that is, first to third clutches C1 to C3, and three brakes, that is, second to fourth brakes B2 to B4. The first clutch C1 is an oil pressure driven wet multiple disc clutch. The first clutch C1 is configured so as to be switchable between a connection mode in which the sun gear Sa (the first element) of the first planetary gear set PGS1 is connected to the third connected member Cc-Cd and a release mode in which the sun gear Sa is disconnected from the third connected member Cc-Cd.

The second clutch C2 is an oil pressure driven wet multiple disc clutch. The second clutch C2 is configured so as to be switchable between a connection mode in which the sun gear Sa (the first element) of the first planetary gear set PGS1 is connected to the ring gear Rb (the fourth element) of the second planetary gear set PGS2 and a release mode in which the sun gear Sa is disconnected from the ring gear Rb. The third clutch C3 is an oil pressure driven wet multiple disc clutch. The third clutch C3 is configured so as to be switchable between a connection mode in which the sun gear Sb (The sixth element) of the second planetary gear set PGS2 is connected to the second connected member Ra-Sd and a release mode in which the sun gear Sb is disconnected from the second connected member Ra-Sd.

The first brake B1 is formed from a two-way clutch. The first brake B1 is configured so as to be switchable between a reverse rotation prevention mode in which the forward rotation (rotation in the same direction as that of the input shaft 2) of the third connected member Cc-Cd is allowed and the reverse rotation of the third connected member Cc-Cd is prevented and a fixed mode in which the third connected member Cc-Cd is fixed to the housing 1 and rotation of the third connected member Cc-Cd is prevented. The second brake B2 is formed from an oil pressure driven wet multiple disc brake. The second brake B2 is configured so as to be switchable between a fixed mode in which the sun gear Sc (the seventh element) of the third planetary gear set PGS3 is fixed to the housing 1 and a release mode in which the sun gear Sc is unfixed from the housing 1.

The third brake B3 is formed from an oil pressure driven wet multiple disc brake. The third brake B3 is configured so as to be switchable between a fixed mode in which the sun gear Sb (the sixth element) of the second planetary gear set PGS2 is fixed to the housing 1 and a release mode in which the sun gear Sb is unfixed from the housing 1. The fourth brake B4 is formed from an oil pressure driven wet multiple disc brake. The fourth brake B4 is configured so as to be switchable between a fixed mode in which the ring gear Rb (the fourth element) of the second planetary gear set PGS2 is fixed to the housing 1 and a release mode in which the ring gear Rb is unfixed from the housing 1.

The mode of each of the clutches C1 to C3 and the brakes B1 to B4 is switchable under the control of a control unit ECU functioning as a transmission control unit (refer to FIG. 1) on the basis of vehicle information, such as a travel speed of the vehicle.

The first clutch C1, the third planetary gear set PGS3, the fourth planetary gear set PGS4, the first planetary gear set PGS1, the third clutch C3, the second planetary gear set PGS2, and the second clutch C2 are arranged along the axis line of the input shaft 2 in sequence from the side adjacent to the drive source ENG and the torque converter TC.

The fourth brake B4 is disposed outward of the second planetary gear set PGS2 in the radial direction. The third brake B3 is disposed outward of the third clutch C3 in the radial direction. The first brake B1 is disposed outward of the third planetary gear set PGS3 in the radial direction. The second brake B2 is disposed outward of the first clutch C1 in the radial direction. By disposing the four brakes B1 to B4 outward of a planetary gear set or a clutch in the radial direction in this manner, the shaft length of the automatic transmission TM can be reduced, as compared with the case in which the brakes B1 to B4 are arranged along the axis line of the input shaft 2 together with a planetary gear set or a clutch. Note that the fourth brake B4 may be disposed outward of the second clutch C2 in the radial direction, and the third brake B3 may be disposed outward of the second planetary gear set PGS2 in the radial direction.

A technique for establishing each of the speed ratios of the automatic transmission TM according to the exemplary embodiment is described below with reference to FIGS. 3 and 4.

To achieve a first forward speed ratio, the first brake B1 formed from a two-way clutch is set in the reverse rotation prevention mode ("R" in FIG. 4), and the second brake B2 and the third brake B3 are set in the fixed mode. By setting the first brake B1 in the reverse rotation prevention mode, reverse rotation of the third connected member Cc-Cd is prevented. In addition, by setting the second brake B2 in the fixed mode, the rotational speed of the sun gear Sc (the seventh element) of the third planetary gear set PGS3 can be set to "0", and the rotational speed of the third connected member Cc-Cd is also set to "0".

In this manner, the seventh to ninth elements Sc, Cc, and Rc of the third planetary gear set PGS3 enter a lock mode in which relative rotation of the elements is disabled. Accordingly, the rotational speed of the first connected member Ca-Cb-Rc including the ring gear Rc (the ninth element) of the third planetary gear set PGS3 is also set to "0". In addition, the rotational speed of the ring gear Rd (the tenth element) of the fourth planetary gear set PGS4 having the output member 3 connected thereto is set to "1st" illustrated in FIG. 4. In this manner, the first forward speed ratio is established.

Note that the third brake B3 need not be set in the fixed mode in order to achieve the first forward speed ratio. However, in order to smoothly change from the first forward speed ratio to a second forward speed ratio (described in more detail below), the third brake B3 is set in the fixed mode in the first forward speed ratio. In addition, in order to activate an engine brake in the first forward speed ratio, the first brake B1 formed from a two-way clutch can be switched to the fixed mode ("L" in FIG. 4).

In order to establish a second forward speed ratio, the first brake B1 formed from a two-way clutch is set in the reverse rotation prevention mode ("R" in FIG. 4), the second brake B2 and the third brake B3 are set in the fixed mode, and the third clutch C3 is set in a connection mode. By setting the first brake B1 in the reverse rotation prevention mode, forward rotation of the third connected member Cc-Cd is allowed. In addition, by setting the second brake B2 in the fixed mode, the rotational speed of the sun gear Sc (the seventh element) of the third planetary gear set PGS3 is set to "0". Furthermore, by setting the third brake B3 in the fixed mode, the rotational speed of the sun gear Sb (the sixth element) of the second planetary gear set PGS2 is set to "0".

In addition, by setting the third clutch C3 in a connection mode, the rotational speed of the second connected member Ra-Sd is set to "0", which is the same rotational speed as that of the sun gear Sb (the sixth element) of the second planetary gear set PGS2. Furthermore, the rotational speed of the ring gear Rd (the tenth element) of the fourth planetary gear set PGS4 having the output member 3 connected thereto is set to "2nd" illustrated in FIG. 3.

In order to establish a third forward speed ratio, the first brake B1 formed from a two-way clutch is set in a the reverse rotation prevention mode, the second brake B2 and the third brake B3 are set in the fixed mode, and the second clutch C2 is set in a connection mode. By setting the first brake B1 in the reverse rotation prevention mode, forward rotation of the third connected member Cc-Cd is allowed. In addition, by setting the second brake B2 in the fixed mode, the rotational speed of the sun gear Sc (the seventh element) of the third planetary gear set PGS3 is set to "0". Furthermore, by setting the third brake B3 in the fixed mode, the rotational speed of the sun gear Sb (the sixth element) of the second planetary gear set PGS2 is set to "0".

In addition, by setting the second clutch C2 in a connection mode, the rotational speed of the ring gear Rb (the fourth element) of the second planetary gear set PGS2 is set to "1", which is the same rotational speed as that of the sun gear Sa (the first element) of the first planetary gear set PGS1 connected to the input shaft 2. Since the rotational speed of the sun gear Sb (the sixth element) of the second planetary gear set PGS2 is set to "0" and the rotational speed of the ring gear Rb (the fourth element) is set to "1", the rotational speed of the carrier Cb (the fifth element), that is, the rotational speed of the first connected member Ca-Cb-Rc is set to i/(i+1). In addition, the rotational speed of the ring gear Rd (the tenth element) of the fourth planetary gear set PGS4 having the output member 3 connected thereto is set to "3rd" illustrated in FIG. 3. In this manner, the third forward speed ratio is established.

In order to establish a fourth forward speed ratio, the first brake B1 formed from a two-way clutch is set in a reverse rotation prevention mode, the second brake B2 is set in the fixed mode, and the second clutch C2 and the third clutch C3 are set in a connection mode. By setting the first brake B1 in the reverse rotation prevention mode, forward rotation of the third connected member Cc-Cd is allowed. In addition, by setting the second brake B2 in the fixed mode, the rotational speed of the sun gear Sc (the seventh element) of the third planetary gear set PGS3 is set to "0".

Furthermore, by setting the third clutch C3 in the connection mode, the sun gear Sb (the sixth element) of the second planetary gear set PGS2 and the second connected member Ra-Sd rotate at the same speed. Thus, the carrier Ca (the second element) of the first planetary gear set PGS1 is connected to the carrier Cb (the fifth element) of the second planetary gear set PGS2, and the ring gear Ra (the third element) of the first planetary gear set PGS1 is connected to the sun gear Sb (the sixth element) of the second planetary gear set PGS2. Accordingly, in the fourth forward speed ratio in which the third clutch C3 is set in a connection mode, a collinear diagram including four elements in the first planetary gear set PGS1 and the second planetary gear set PGS2 can be obtained.

In addition, by setting the second clutch C2 in a connection mode, the rotational speed of the ring gear Rb (the fourth element) of the second planetary gear set PGS2 is set to the speed "1", which is the same rotational speed as that of the sun gear Sa (the first element) of the first planetary gear set PGS1. Accordingly, two of the four rotary elements formed from the first planetary gear set PGS1 and the second planetary gear set PGS2 have the same rotational speed "1".

Accordingly, all the elements of the first planetary gear set PGS1 and the second planetary gear set PGS2 are set in a lock mode in which relative rotation of the elements is disabled and, thus, the rotational speeds of all of the elements of the first planetary gear set PGS1 and the second planetary gear set PGS2 are set to "1". In addition, the rotational speed of the third connected member Cc-Cd is set to j/(j+1), and the rotational speed of the ring gear Rd (the tenth element) of the fourth planetary gear set PGS4 having the output member 3 connected thereto is set to "4th" illustrated in FIG. 3. In this manner, the fourth forward speed ratio is established.

In order to establish a fifth forward speed ratio, the first brake B1 formed from a two-way clutch is set in a the reverse rotation prevention mode, the second brake B2 is set in the fixed mode, and the first clutch C1 and the second clutch C2 are set in a connection mode. By setting the first brake B1 in the reverse rotation prevention mode, forward rotation of the third connected member Cc-Cd is allowed. In addition, by setting the second brake B2 in the fixed mode, the rotational speed of the sun gear Sc (the seventh element) of the third planetary gear set PGS3 is set to "0".

In addition, by setting the first clutch C1 in a connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 having the output member 3 connected thereto is set to "5th" illustrated in FIG. 3. In this manner, the fifth forward speed ratio is established.

Note that in order to establish the fifth forward speed ratio, the second clutch C2 need not be set in the connection mode. However, in the fourth forward speed ratio and the sixth forward speed ratio (described in more detail below), the second clutch C2 needs to be set in a connection mode. Accordingly, in order to smoothly perform downshift from the fifth forward speed ratio to the fourth forward speed ratio and upshift from the fifth forward speed ratio to the sixth forward speed ratio (described below), the second clutch C2 is set in the connection mode even in the fifth forward speed ratio.

In order to establish a sixth forward speed ratio, the first brake B1 formed from a two-way clutch is set in the reverse rotation prevention mode, and the first to third clutches C1 to C3 are set in the connection mode. By setting the first brake B1 in the reverse rotation prevention mode, forward rotation of the third connected member Cc-Cd is allowed.

In addition, by setting the second clutch C2 and the third clutch C3 in the connection mode, the elements of the first planetary gear set PGS1 and the second planetary gear set PGS2 are set in a mode in which relative rotation of the elements is disabled, as described in the fourth forward speed ratio. Thus, the rotational speed of the second connected member Ra-Sd is set to "1". In addition, by setting the first clutch C1 in the connection mode, the rotational speed of the third connected member Cc-Cd is set to "1".

Accordingly, the rotational speeds of the carrier Cd (the eleventh element) and the sun gear Sd (the twelfth element) of the fourth planetary gear set PGS4 are set to the same speed "1". Thus, the fourth planetary gear set PGS4 enters a lock mode in which relative rotation of the elements is disabled. Consequently, the rotational speed of the ring gear Rd (the tenth element) of the fourth planetary gear set PGS4 having the output member 3 connected thereto is set to "1" indicated by "6th" illustrated in FIG. 3. In this manner, the sixth forward speed ratio is established.

In order to establish a seventh forward speed ratio, the first brake B1 formed from a two-way clutch is set in the reverse rotation prevention mode, the third brake B3 is set in the fixed mode, and the first clutch C1 and the second clutch C2 are set in the connection mode. By setting the first brake B1 in the reverse rotation prevention mode, forward rotation of the third connected member Cc-Cd is allowed.

In addition, by setting the third brake B3 in the fixed mode, the rotational speed of the sun gear Sb (the sixth element) of the second planetary gear set PGS2 is set to "0". Furthermore, by setting the second clutch C2 in the connection mode, the rotational speed of the ring gear Rb (the fourth element) of the second planetary gear set PGS2 is set to "1", which is the same rotational speed as that of the sun gear Sa (the first element) of the first planetary gear set PGS1. Thus, the rotational speed of the first connected member Ca-Cb-Rc including the carrier Cb (the fifth element) of the second planetary gear set PGS2 is set to i/(i+1).

Still furthermore, by setting the first clutch C1 in the connection mode, the rotational speed of the third connected member Cc-Cd is set to "1", which is the same rotational speed as that of the sun gear Sa (the first element) of the first planetary gear set PGS1 connected to the input shaft 2. Thus, the rotational speed of the ring gear Rd (the tenth element) of the fourth planetary gear set PGS4 having the output member 3 connected thereto is set to "7th" illustrated in FIG. 3. In this manner, the seventh forward speed ratio is established.

In order to establish an eighth forward speed ratio, the first brake B1 formed from a two-way clutch is set in the reverse rotation prevention mode, the third brake B3 is set in the fixed mode, and the first clutch C1 and the third clutch C3 are set in the connection mode. By setting the first brake B1 in the reverse rotation prevention mode, forward rotation of the third connected member Cc-Cd is allowed.

In addition, by setting the third brake B3 in the fixed mode, the rotational speed of the sun gear Sb (the sixth element) of the second planetary gear set PGS2 is set to "0". Furthermore, by setting the third clutch C3 in the connection mode, the rotational speed of the second connected member Ra-Sd is set to "0", which is the same rotational speed as that of the sun gear Sb (the sixth element) of the second planetary gear set PGS2. Still furthermore, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 having the output member 3 connected thereto is set to "8th" illustrated in FIG. 3. In this manner, the eighth forward speed ratio is established.

In order to establish a ninth forward speed ratio, the first brake B1 formed from a two-way clutch is set in the reverse rotation prevention mode, the third brake B3 and the fourth brake B4 are set in the fixed mode, and the first clutch C1 is set in the connection mode. By setting the first brake B1 in the reverse rotation prevention mode, forward rotation of the third connected member Cc-Cd is allowed.

In addition, by setting the third brake B3 in the fixed mode, the rotational speed of the sun gear Sb (the sixth element) of the second planetary gear set PGS2 is set to "0". Furthermore, by setting the fourth brake B4 in the fixed mode, the rotational speed of the ring gear Rb (the fourth element) of the second planetary gear set PGS2 is also set to "0". Accordingly, the elements Sb, Cb, and Rb of the second planetary gear set PGS2 enter a lock mode in which relative rotation of the elements is disabled. Thus, the rotational speed of the first connected member Ca-Cb-Rc including the carrier Cb (the fifth element) of the second planetary gear set PGS2 is also set to "0".

Still furthermore, by setting the first clutch C1 in the connection mode, the rotational speed of the third connected member Cc-Cd is set to "1", which is the same rotational speed of the sun gear Sa (the first element) of the first planetary gear set PGS1. Thus, the rotational speed of the ring gear Rd (the tenth element) of the fourth planetary gear set PGS4 having the output member 3 connected thereto is set to "9th" illustrated in FIG. 3. In this manner, the ninth forward speed ratio is established.

In order to establish a tenth forward speed ratio, the first brake B1 formed from a two-way clutch is set in the reverse rotation prevention mode, the fourth brake B4 is set in the fixed mode, and the first clutch C1 and the third clutch C3 are set in the connection mode. By setting the first brake B1 in the reverse rotation prevention mode, forward rotation of the third connected member Cc-Cd is allowed.

Furthermore, by setting the third clutch C3 in a connection mode, the second connected member Ra-Sd and the sun gear Sb (the sixth element) of the second planetary gear set PGS2 rotate at the same speed. Still furthermore, by setting the fourth brake B4 in the fixed mode, the rotational speed of the ring gear Rb (the fourth element) of the second planetary gear set PGS2 is set to "0". In addition, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 having the output member 3 connected thereto is set to "10th" illustrated in FIG. 3. In this manner, the tenth forward speed ratio is established.

In order to establish a reverse speed ratio, the first brake B1 formed from a two-way clutch is set in the fixed mode, the third brake B3 is set in the fixed mode, and the second clutch C2 is set in the connection mode. By setting the third brake B3 in the fixed mode and setting the second clutch C2 in the connection mode, the rotational speed of the first connected member Ca-Cb-Rc is set to i/(i+1). Furthermore, by setting the first brake B1 in a fixed mode, rotation of the third connected member Cc-Cd is prevented and, thus, the rotational speed of the third connected member Cc-Cd is set to "0". Accordingly, the rotational speed of the ring gear Rd (the tenth element) of the fourth planetary gear set PGS4 having the output member 3 connected thereto is set to "Rvs" indicating reverse rotation illustrated in FIG. 3. In this manner, the reverse speed ratio is established.

Note that the speed line indicated by a dashed line in FIG. 3 indicates that among the four planetary gear sets PGS1 to PGS4, elements of the planetary gear sets other than the planetary gear set that transfers drive power rotate (rotate idle) while following the planetary gear set that transfers the drive power.

FIG. 4 illustrates all the modes of the clutches C1 to C3 and the brakes B1 to B4 in the above-described speed ratios. The symbol "0" in the columns of the first to third clutches C1 to C3 and the second brake B2 to the fourth brake B4 indicates the connection mode or the fixed mode. The empty cells indicate the release mode. In addition, in the column of the first brake B1, the symbol "R" indicates the reverse rotation prevention mode, and the symbol "L" indicates the fixed mode.

In addition, the symbols "R" and "L" with an underline indicate that the rotational speed of the third connected member Cc-Cd is set to "0" due to the effect of the first brake B1. In addition, the symbol "R/L" indicates that the reverse rotation prevention mode "R" is maintained at normal times, but the reverse rotation prevention mode is switched to the fixed mode "L" when an engine brake is activated.

FIG. 4 further illustrates the transmission gear ratio in each of the speed ratios (the rotational speed of the input shaft 2/the rotational speed of the output member 3) and the common ratios (the ratio of one of the transmission gear ratios to the next transmission ratio, that is, a value obtained by dividing a given transmission gear ratio by the transmission gear ratio that is one-step higher than the speed ratio). In FIG. 4, the gear ratio h of the first planetary gear set PGS1 is set to 2.734, the gear ratio i of the second planetary gear set PGS2 is set to 1.614, the gear ratio j of the third planetary gear set PGS3 is set to 2.681, and the gear ratio k of the fourth planetary gear set PGS4 is set to 1.914. As can be seen from FIG. 4, the common ratios can be set to appropriate values.

The two-way clutch is described in detail next with reference to FIGS. 5A to 5C. The first brake B1 is formed from a two-way clutch that is switchable between the fixed mode in which the third connected member Cc-Cd is fixed to the housing 1 and the reverse rotation prevention mode in which forward rotation of the third connected member Cc-Cd is allowed and reverse rotation of the third connected member Cc-Cd is prevented. An example of the two-way clutch is illustrated in FIGS. 5A to 5C and is described below.

Figure 5A:
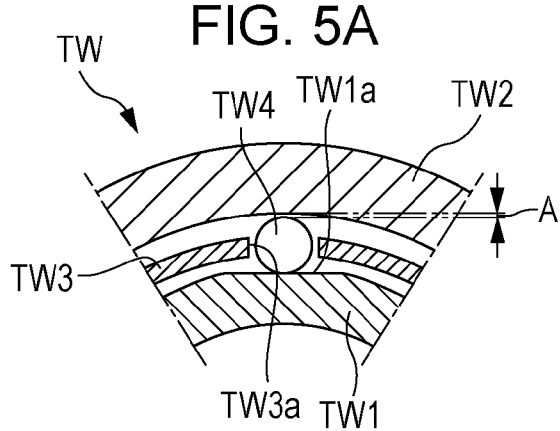
FIGS. 5A to 5C illustrate a two-way clutch according to the present exemplary embodiment.
Figure 5B:
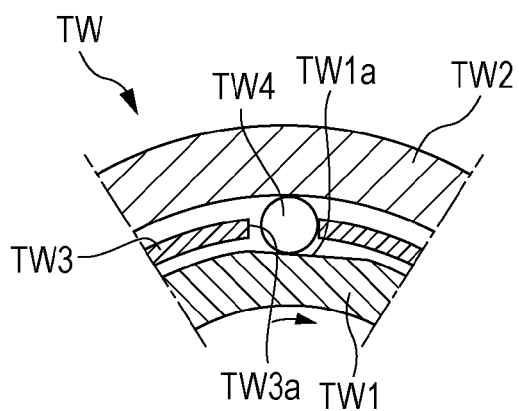
Figure 5C:
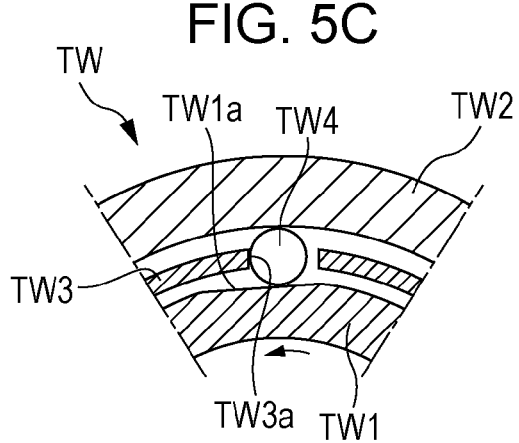

As illustrated in FIGS. 5A to 5C, a two-way clutch TW that forms the first brake B1 includes an inner ring TW1 connected to the third connected member Cc-Cd, an outer ring TW2 that is disposed outward of the inner ring TW1 in the radial direction with a spacing therebetween and that is connected to the housing 1, and a retaining ring TW3 disposed between the inner ring TW1 and the outer ring TW2.

The inner ring TW1 has a plurality of cam surfaces TW1$a$ formed on the outer peripheral surface thereof. The retaining ring TW3 has a plurality of cutout holes TW3$a$ each formed so as to correspond to one of the cam surfaces TW1$a$. Each of the cutout holes TW3$a$ contains a roller TW4. In addition, the two-way clutch TW includes a meshing mechanism (not illustrated).

The meshing mechanism is configured so as to be switchable between an outer connection mode in which the outer ring TW2 is connected to the retaining ring TW3 and an inner connection mode in which the inner ring TW1 is connected to the retaining ring TW3.

The diameter of the roller TW4 is set so that when, as illustrated in FIG. 5A, the roller TW4 is located in the middle of the cam surface TW1$a$, a gap A appears and, when, as illustrated in FIGS. 5B and 5C, the roller TW4 is located at an end of the cam surface TW1$a$, the roller TW4 is in contact with the inner ring TW1 and the outer ring TW2.

In the case where the meshing mechanism is in the outer connection mode in which the outer ring TW2 is connected to the retaining ring TW3, even when the inner ring TW1 attempts to rotate in the forward direction or the reverse direction, the roller TW4 is held at an end of the cam surface TW1$a$ as illustrated in FIGS. 5B and 5C, since the retaining ring TW3 is fixed to the housing 1.

At that time, the roller TW4 is sandwiched by the cam surface TW1$a$ and the inner peripheral surface of the outer ring TW2 and, thus, rotation of the inner ring TW1 is prevented. That is, the two-way clutch TW enters the fixed mode.

In contrast, when the meshing mechanism (not illustrated) is in the inner connection mode in which the inner ring TW1 is connected to the retaining ring TW3, the cutout hole TW3$a$ is located at one end of the cam surface TW1$a$, as illustrated in FIG. 5B.

Let a reverse rotation direction be defined as the counterclockwise direction in FIGS. 5A to 5C. Then, by setting the two-way clutch TW in the inner connection mode in which the inner ring TW1 is connected to the retaining ring TW3, the two-way clutch TW can enter the reverse rotation prevention mode.

In addition, a vehicle having the automatic transmission TM mounted therein includes a shift-by-wire shift lever 42 (a shift position detecting unit) that can selectably change the shift position to a forward drive range, a neutral drive range, and a reverse drive range, an oil temperature detecting unit 43$a$ that detects the temperature of oil (the oil temperature) in an oil pressure control channel 43, a vehicle speed detecting unit 44 that detects the travel speed of the vehicle, an engine braking determination unit 46 that determines whether engine braking is on or off, a drive source rotational speed detecting unit 48 that detects the rotational speed of the drive source ENG, an input rotational speed detecting unit 50 that detects the rotational speed of the input shaft 2, a brake pedal detecting unit 54 that detects whether a brake pedal is on or off, and an accelerator pedal position detecting unit 56 that detects whether an accelerator pedal is on or off.

The control unit ECU receives the following information items: a shift position of the shift lever 42, the temperature of oil (the oil temperature) of the oil pressure control channel 43 output from the oil temperature detecting unit 43$a$, the travel speed of the vehicle output from a vehicle speed detecting unit 44, on/off of an engine brake as a use condition of engine braking output from an engine braking determination unit 46, the rotational speed of the drive source ENG output from a drive source rotational speed detecting unit 48, the rotational speed of the input shaft 2 output from an input rotational speed detecting unit 50, on/off of the brake pedal output from the brake pedal detecting unit 54, and on/off of the accelerator pedal output from the accelerator pedal position detecting unit 56.

A reverse preparation mode of the automatic transmission TM according to the present exemplary embodiment is described below with reference to FIGS. 6 and 7. The primary function of the reverse preparation mode is performed in the reverse drive range (an R range) immediately after the shift lever 42 is operated to change the shift position from the forward drive range (a D range) to the reverse drive range through the neutral drive range (an N range). In addition, the reverse preparation mode is performed with a predetermined cycle time.

Note that when the shift lever 42 is operated to change the shift position from the forward drive range to the neutral drive range, the automatic transmission TM according to the present exemplary embodiment is controlled so as to set the first clutch C1, the second clutch C2, and the fourth brake B4 in the engagement mode. Thus, a neutral preparation process (a mode of the automatic transmission TM indicated by "D→N OFF" in FIG. 7) in which the rotational speed of the input shaft 2 is decreased is performed until a predetermined period of time during which the rotational speed of the input shaft 2 presumably decreases to a desired rotational speed elapses.

Figure 6:
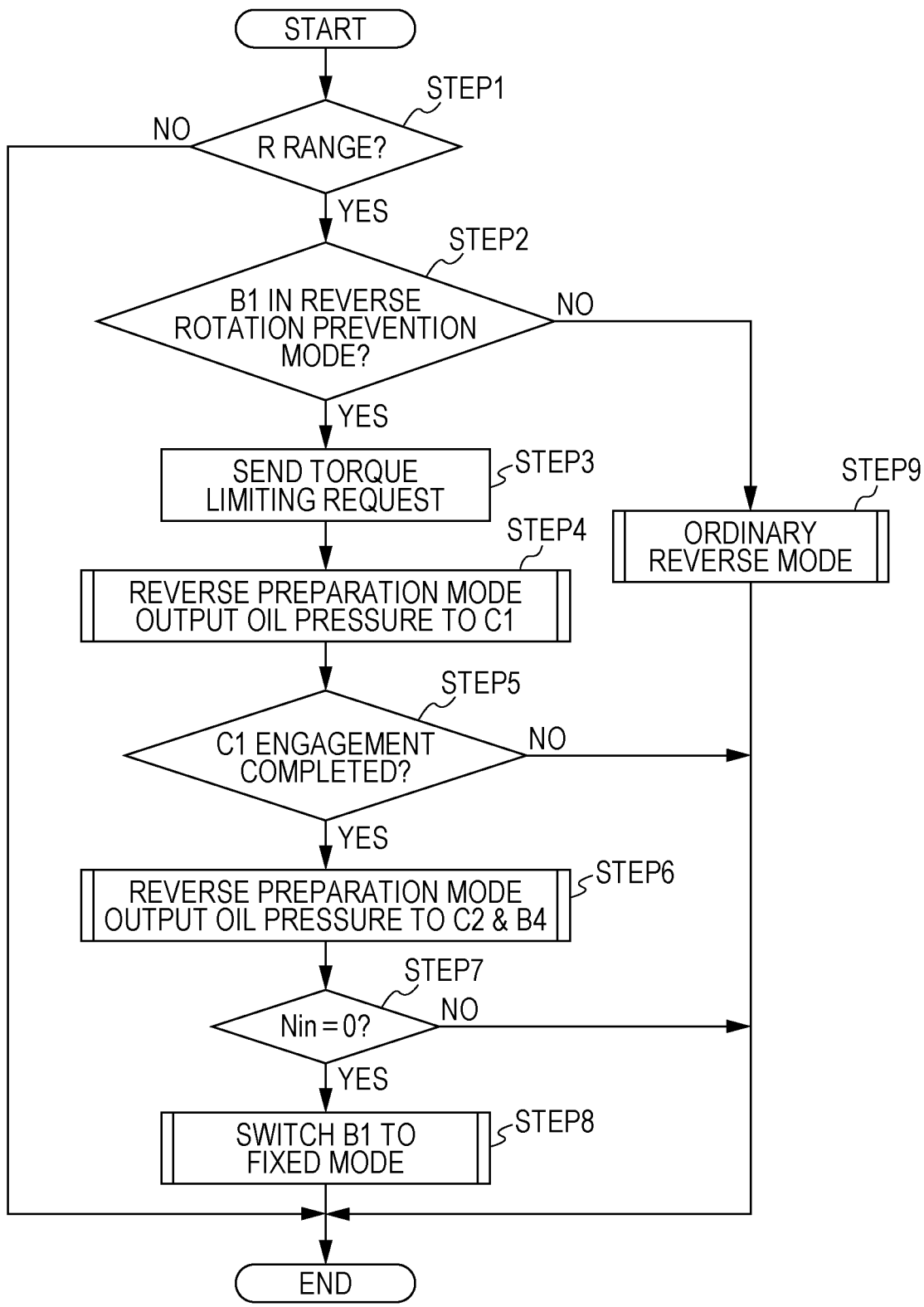
FIG. 6 is a flowchart illustrating a process in a reverse preparation mode according to the present exemplary embodiment.

As illustrated in FIG. 6, in step 1, it is determined whether the shift position is changed from the neutral drive range (the N range) to the reverse drive range (the R range). If the shift position is not changed from the neutral drive range to the reverse drive range, the processing is immediately completed. However, if the shift position is changed from the neutral drive range to the reverse drive range, the processing proceeds to step 2, where it is determined whether the first brake B1 is in the reverse rotation prevention mode.

If, in step 2, the first brake B1 is in the reverse rotation prevention mode, the processing proceeds to step 3, where an output torque limiting request is sent to the drive source ENG for traveling in order to prevent the torque from abruptly increasing. Thereafter, the processing proceeds to step 4, where an oil pressure is supplied (output) to the first clutch C1 so that the first clutch C1 starts processing in a reverse preparation mode (R preparation).

Thereafter, the processing proceeds to step 5, where it is determined whether engagement of the first clutch C1 is completed. If engagement of the first clutch C1 is not completed, the processing is immediately completed. However, if engagement of the first clutch C1 is completed, the processing proceeds to step 6, where oil pressure is supplied (output) to the second clutch C2 and the fourth brake B4.

Subsequently, the processing proceeds to step 7, where it is determined whether a rotational speed Nin of the input shaft 2 is lower than or equal to a predetermined speed ("0" in the present exemplary embodiment).

Note that in step 7, since engagement of the first clutch C1 is completed, it can be estimated that the rotational speed Nin of the input shaft 2 is the same as the rotational speed of the carrier Cd (the eleventh element). That is, in step 7, it is determined whether the rotational speed of the carrier Cd (the eleventh element) is "0" representing the predetermined speed. According to the present exemplary embodiment, determination of the rotational speed of the input shaft 2 is the same as determination of the rotational speed of the carrier Cd (the eleventh element).

If the rotational speed Nin of the input shaft 2 does not reach "0", the processing is immediately completed. However, if, in step 7, the rotational speed Nin of the input shaft 2 is "0", the processing proceeds to step 8, where the first brake B1 is switched from the reverse rotation prevention mode to the fixed mode. Thereafter, the processing is completed.

After the first brake B1 is switched from the reverse rotation prevention mode to the fixed mode in step 8, the processing branches to step 9, since the first brake B1 is in the fixed mode in step 2 of the flowchart illustrated in FIG. 6. In step 9, an ordinary reverse drive range process (an ordinary reverse mode) is performed. Thereafter, the processing is completed. Note that as illustrated in FIG. 7, in the ordinary reverse mode after the process in the reverse preparation mode (R preparation) is completed, the reverse gearshift process (N-R gearshift) is performed and, subsequently, a reverse steady (R steady) process is performed.

According to the automatic transmission TM of the present exemplary embodiment, the first clutch C1 is engaged first in the reverse preparation mode. Thus, the rotational speed of the rotational speed of the input shaft 2 is the same as the rotational speed of the third connected member Cc-Cd. Accordingly, by using the input rotational speed detecting unit 50 that detects the rotational speed of the input shaft 2, the rotational speed of the carrier Cd (the eleventh element) of the fourth planetary gear set PGS4 can be detected without additionally providing a detecting unit for detecting the rotational speed of the carrier Cd (the eleventh element) of the fourth planetary gear set PGS4.

In addition, by setting the second clutch C2 and the fourth brake B4 in the engagement mode while detecting the rotational speed of the carrier Cd (the eleventh element) of the fourth planetary gear set PGS4 using the input rotational speed detecting unit 50, the carrier Cd (the eleventh element) of the fourth planetary gear set PGS4 can be braked. In this manner, the rotational speed of the carrier Cd (the eleventh element) can be decreased to "0".

Figure 7:
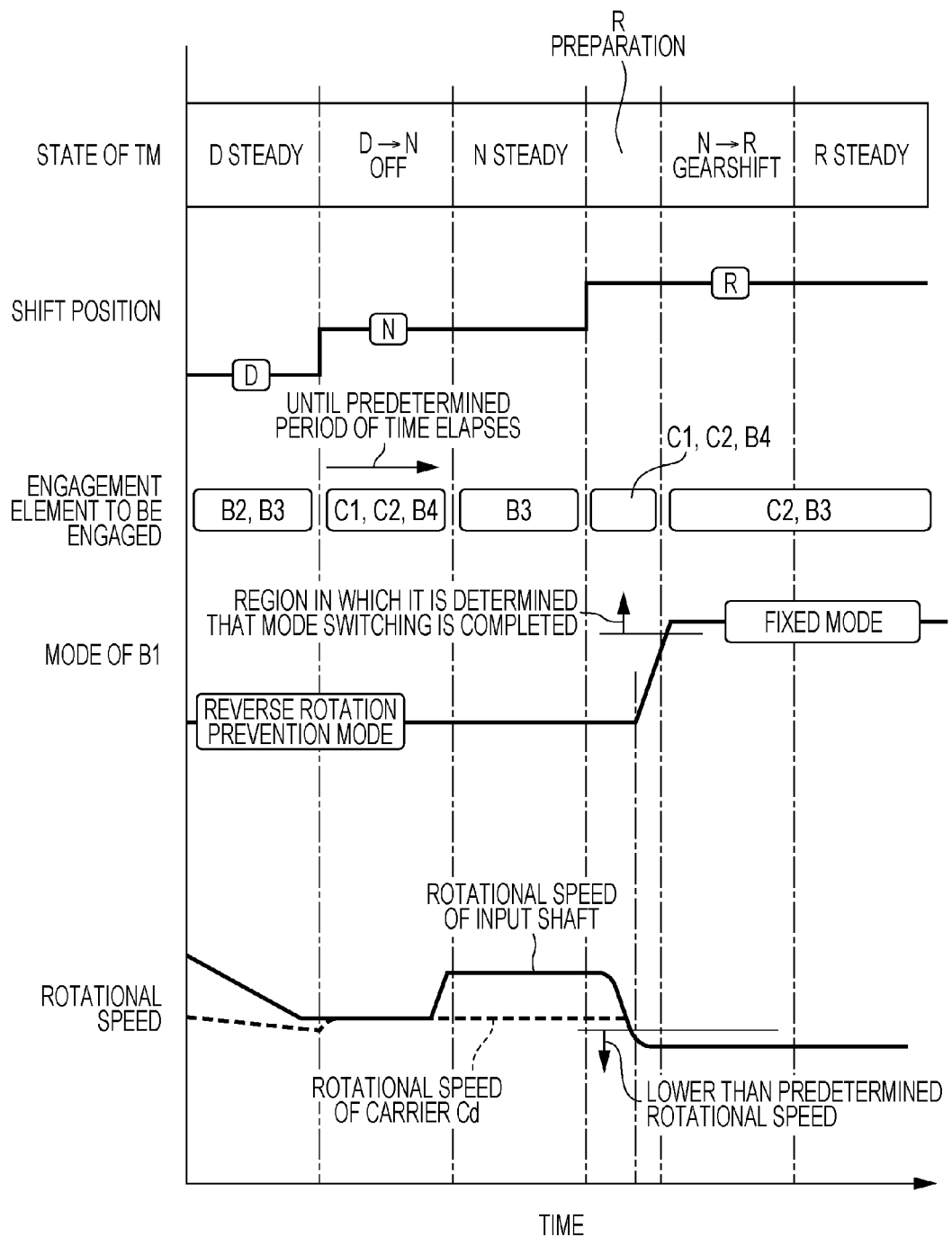
FIG. 7 illustrates the operation performed by a switching mechanism that performs in the reverse preparation mode according to the present exemplary embodiment.

Furthermore, according to the automatic transmission TM of the present exemplary embodiment, by setting the first clutch C1 and the second clutch C2 serving as engagement mechanisms in the connection mode using the reverse preparation mode illustrated in the flowchart of FIG. 6 and indicated by "R preparation" in FIG. 7 and setting the fourth brake B4 also serving as an engagement mechanism in the fixed mode, the rotational speed of the carrier Cd (the eleventh element) of the fourth planetary gear set PGS4 fixed by the first brake B1 serving as a switching mechanism can be set to "0" In this manner, the first brake B1 can be more promptly switched to the fixed mode than in the case where the rotational speed of the carrier Cd naturally decreases to "0". In addition, the switching noise generated by the first brake B1 can be reduced.

The automatic transmission TM of another exemplary embodiment of the present disclosure is described below with reference to FIG. 8. According to the present exemplary embodiment, the second clutch C2 and the fourth brake B4 are engaged in the reverse preparation mode and, thus, the rotational speed of the input shaft 2 is set to "0". Thereafter, the first clutch C1 is engaged so that the rotational speed of the carrier Cd (the eleventh element) of the fourth planetary gear set PGS4 is set to "0", which is the same rotational speed as that of the input shaft 2.

Figure 8:
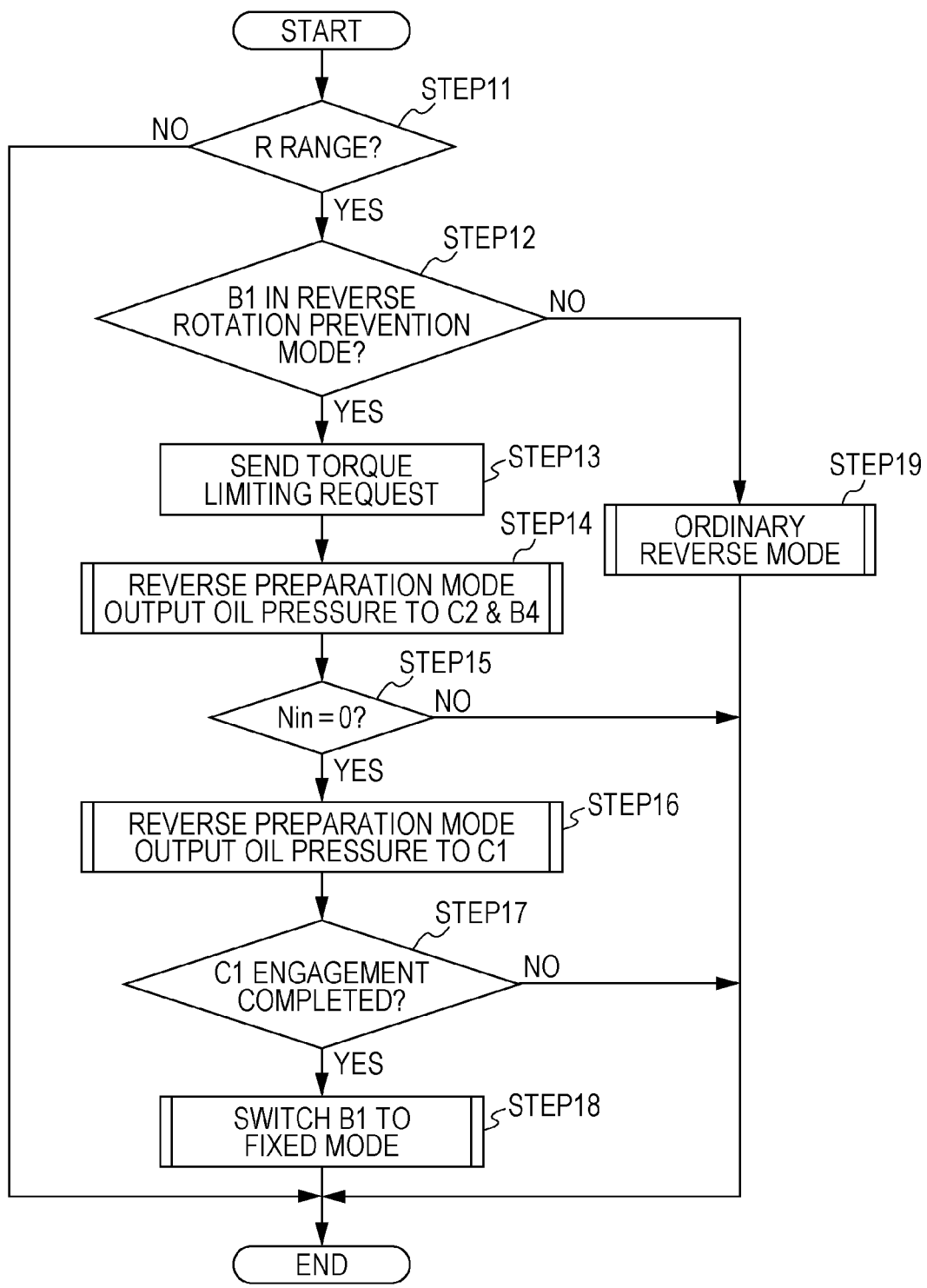
FIG. 8 is a flowchart illustrating the process in the reverse preparation mode according to the present exemplary embodiment.

As illustrated in FIG. 8, in step 11, it is determined whether the shift position is changed from the neutral drive range (the N range) to the reverse drive range (the R range). If the shift position is not changed from the neutral drive range to the reverse drive range, the processing is immediately completed. However, if the shift position is changed from the neutral drive range to the reverse drive range, the processing proceeds to step 12, where it is determined whether the first brake B1 is in the reverse rotation prevention mode.

If, in step 12, the first brake B1 is in the reverse rotation prevention mode, the processing proceeds to step 13, where an output torque limiting request is sent to the drive source ENG for traveling in order to prevent the torque from abruptly increasing. Thereafter, the processing proceeds to step 14, where oil pressure is supplied (output) to the second clutch C2 and the fourth brake B4. In this manner, the processing in the reverse preparation mode (R preparation) is started.

Subsequently, the processing proceeds to step 15, where it is determined whether the rotational speed Nin of the input shaft 2 reaches "0". If the rotational speed Nin of the input shaft 2 is not "0", the processing is immediately completed.

However, if, in step 15, the rotational speed Nin of the input shaft 2 is "0", the processing proceeds to step 16, where oil pressure is supplied (output) to the first clutch C1. Thereafter, the processing proceeds to step 17, where it is determined whether engagement of the first clutch C1 is completed. If engagement of the first clutch C1 is not completed, the processing is immediately completed.

However, if, in step 17, engagement of the first clutch C1 is completed, the rotational speed Nin of the input shaft 2 can be estimated to be the same as the rotational speed of the carrier Cd (the eleventh element). That is, in step 17, it is determined whether the rotational speed of the carrier Cd (the eleventh element) is "0". According to the present exemplary embodiment, determination as to whether engagement of the first clutch C1 is completed is the same as determination as to whether the rotational speed of the carrier Cd (the eleventh element) is "0".

If, in step 17, engagement of the first clutch C1 is completed, the processing proceeds to step 18, where the first brake B1 is switched from the reverse rotation prevention mode to the fixed mode. Thereafter, the processing is completed.

After the first brake B1 is switched from the reverse rotation prevention mode to the fixed mode in step 18, the processing branches to step 19, since the first brake B1 is in the fixed mode in step 12 of the flowchart illustrated in FIG. 8. In step 19, an ordinary reverse drive range process (an ordinary reverse mode) is started. Thereafter, the processing is completed. Note that like the above-described exemplary embodiment, according to the present exemplary embodiment, in the ordinary reverse mode after the process in the reverse preparation mode (R preparation) is completed, the reverse gearshift process (N→R gearshift) is performed and, subsequently, a reverse steady (R steady) process is performed.

According to the automatic transmission TM of the present exemplary embodiment, in the reverse preparation mode, the second clutch C2 and the fourth brake B4 are engaged to brake the input shaft 2. In this manner, the rotational speed of the input shaft 2 is decreased to "0". Subsequently, the first clutch C1 is engaged so that the rotational speed of the input shaft 2 and the rotational speed of the third connected member Cc-Cd are set to the same speed "0".

According to the present exemplary embodiment, like the exemplary embodiment described first, the rotational speed of the carrier Cd (the eleventh element) of the fourth planetary gear set PGS4 is not increased due to synchronization with the rotational speed of the input shaft 2, as compared with the case where the first clutch C1 is engaged first. As a result, like the exemplary embodiment described first, although the rotational speed of the carrier Cd (the eleventh element) cannot be detected early, the first brake B1 can be switched more efficiently than in the exemplary embodiment described first.

In addition, like the above-described exemplary embodiment, in the automatic transmission TM according to the present exemplary embodiment, by using the reverse preparation mode indicated by "R preparation" in FIG. 7 to set the first clutch C1 and the second clutch C2 each functioning as an engagement mechanism in the connection mode and set the fourth brake B4 also functioning as an engagement mechanism in the fixed mode, the rotational speed of the carrier Cd (the eleventh element) of the fourth planetary gear set PGS4 fixed by the first brake B1 functioning as a switching mechanism can be set to "0". In this manner, the first brake B1 can be more promptly switched to the fixed mode than in the case where the rotational speed of the carrier Cd naturally decreases to "0". In addition, the switching noise generated by the first brake B1 can be reduced.

Note that in the automatic transmissions TM according to the two exemplary embodiments, any one of the speed ratios (e.g., the tenth forward speed ratio) may be removed and, thus, a 9-forward-speed transmission may be provided.

While the above two exemplary embodiments have been described with reference to a shift-by-wire shift lever operation for changing the shift position, the technique for changing the shift position is not limited thereto. For example, the shift position may be changed by pressing a button. In such a case, for example, the selected shift position can be determined using a button pressing signal.

In addition, while the above two exemplary embodiments have been described with reference to the predetermined speed "0", the predetermined speed is not limited thereto. For example, any rotational speed lower than or equal to a speed that can switch the first brake B1 functioning as a switching mechanism from the reverse rotation prevention mode to the fixed mode can be employed. Furthermore, it is desirable that the rotational speed be set to a rotational speed that can reduce the switching noise generated by the first brake B1.

According to a first aspect of an embodiment of the present disclosure, an automatic transmission includes an input member disposed in a housing and configured to receive power transferred from a drive source thereto, a planetary gear set including a plurality of elements rotatable in the housing, a plurality of engagement mechanisms each switchable between a connection mode in which the elements are connected to each other and the fixed mode in which one of the elements is fixed to the housing, an output member, a shift position detecting unit configured to detect a shift position, an input rotational speed detecting unit configured to detect the rotational speed of the input member, a control unit configured to receive information regarding the rotational speed detected by the input rotational speed detecting unit and information regarding the shift position detected by the shift position detecting unit and control the engagement mechanisms, where the rotational speed of the input member is changed into one of a plurality of speeds and the rotation of the input member is output from the output member, and a switching mechanism configured to switch between a reverse rotation prevention mode in which forward rotation of one of the elements representing rotation in a direction to move the vehicle forward is allowed and reverse rotation of the element representing rotation in a direction to move the vehicle backward is prevented and a fixed mode in which the element is fixed to the housing, where the control unit sets the switching mechanism in the reverse rotation prevention mode when a shift position is set to a forward drive range and sets the switching mechanism in the fixed mode when the shift position is set to a reverse drive range. When the shift position is changed from the forward drive range to the reverse drive range, the control unit performs a reverse preparation mode in which the rotational speed of the element fixed by the switching mechanism is lower than or equal to a predetermined speed by setting the engagement mechanism in one of the connection mode and the fixed mode. Upon performing the reverse preparation mode, the control unit engages the engagement mechanism that connects the element fixed by the switching mechanism to the input member and, thereafter, engages the engagement mechanism that makes the rotational speed of the input member lower than or equal to the predetermined speed.

According to the first aspect of an embodiment of the present disclosure, when the reverse preparation mode is performed, the engagement mechanism that connects the element fixed by the switching mechanism to the input member is engaged. In this manner, the element fixed by the switching mechanism and the input member rotate at the same speed. Thus, the rotational speed of the element fixed by the switching mechanism can be detected by the input rotational speed detecting unit.

In addition, after the engagement mechanism that connects the element fixed by the switching mechanism to the input member is engaged, the engagement mechanism that makes the rotational speed of the input member lower than or equal to the predetermined speed is engaged. After the rotational speed detected the input rotational speed detecting unit reaches the predetermined speed or lower, the switching mechanism is switched to the fixed mode. In this manner, the mode of the switching mechanism can be appropriately switched without additionally providing a detecting unit for detecting the rotational speed.

According to a second aspect of an embodiment of the present disclosure, an automatic transmission includes an input member disposed in a housing and configured to receive power transferred from a drive source thereto, a planetary gear set including a plurality of elements rotatable in the housing, a plurality of engagement mechanisms each switchable between a connection mode in which the elements are connected to each other and the fixed mode in which one of the elements is fixed to the housing, an output member, a shift position detecting unit configured to detect a shift position, an input rotational speed detecting unit configured to detect a rotational speed of the input member, a control unit configured to receive information regarding the rotational speed detected by the input rotational speed detecting unit and information regarding the shift position detected by the shift position detecting unit and control the engagement mechanisms, where the rotational speed of the input member is changed into one of a plurality of speeds and the rotation of the input member is output from the output member, and a switching mechanism configured to switch between a reverse rotation prevention mode in which forward rotation of one of the elements representing rotation in a direction to move a vehicle forward is allowed and reverse rotation of the element representing rotation in a direction to move the vehicle backward is prevented and a fixed mode in which the element is fixed to the housing, where the control unit sets the switching mechanism in the reverse rotation prevention mode when a shift position is set to a forward drive range and sets the switching mechanism in the fixed mode when the shift position is set to a reverse drive range. When the shift position is changed from the forward drive range to the reverse drive range, the control unit sets the engagement mechanism in one of the connection mode and the fixed mode so as to perform a reverse preparation mode in which the rotational speed of the element to be fixed by the switching mechanism is lower than or equal to a predetermined speed. Upon performing the reverse preparation mode, the control unit engages the engagement mechanism that makes the rotational speed of the input member lower than or equal to the predetermined speed and, thereafter, engages the engagement mechanism that connects the element fixed by the switching mechanism to the input member.

According to the second aspect of an embodiment of the present disclosure, when the reverse preparation mode is performed, the engagement mechanism that makes the rotational speed of the input member lower than or equal to the predetermined speed is engaged first. Thereafter, after the rotational speed of the input member reaches the predetermined speed or lower, the engagement mechanism that connects the element fixed by the switching mechanism to the input member is engaged.

In this manner, as the gripping pressure of the engagement mechanism that connects the element fixed by the switching mechanism to the input member increases, the rotational speed of the element that is fixed by the switching mechanism gradually decreases to the predetermined speed. If the engagement mechanism that connects the element fixed by the switching mechanism to the input member is completely engaged, the rotational speed of the element that is fixed by the switching mechanism reaches the predetermined speed or lower.

That is, according to the second aspect of an embodiment of the present disclosure, if the engagement mechanism that connects the element fixed by the switching mechanism to the input member is completely engaged, it can be determined that the rotational speed of the element that is fixed by the switching mechanism reaches the predetermined speed or lower without additionally providing a detecting unit that detects the rotational speed and, thus, the switching mechanism can be appropriately switched.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission comprising:
an input member disposed in a housing to receive power transferred from a drive source;
a planetary gear set including a plurality of elements rotatable in the housing;
a plurality of engagement mechanisms each switchable between a connection mode in which the elements are connected to each other and a fixed mode in which one of the elements is fixed to the housing;
an output member;
a shift position detecting unit configured to detect a shift position;
an input rotational speed detecting unit configured to detect the rotational speed of the input member;
a control unit configured to receive information regarding the rotational speed detected by the input rotational speed detecting unit and information regarding the shift position detected by the shift position detecting unit and control the engagement mechanisms, the rotational speed of the input member being changed into one of a plurality of speeds, and the rotation of the input member being output from the output member; and
a switching mechanism configured to switch between a reverse rotation prevention mode in which forward rotation of one of the elements representing rotation in a direction to move a vehicle forward is allowed and reverse rotation of the element representing rotation in a direction to move the vehicle backward is prevented and a fixed mode in which the element is fixed to the housing,
wherein the control unit sets the switching mechanism in the reverse rotation prevention mode when a shift position is set to a forward drive range and sets the switching mechanism in the fixed mode when the shift position is set to a reverse drive range,
wherein when the shift position is changed from the forward drive range to the reverse drive range, the control unit performs a reverse preparation mode in which the rotational speed of the element to be fixed by the switching mechanism is lower than or equal to a predetermined speed by setting the engagement mechanism in one of the connection mode and the fixed mode, and
wherein upon performing the reverse preparation mode, the control unit engages the engagement mechanism that connects the element fixed by the switching mechanism to the input member and, thereafter, engages the engagement mechanism that makes the rotational speed of the input member lower than or equal to the predetermined speed.

2. An automatic transmission comprising:
an input member disposed in a housing to receive power transferred from a drive source;
a planetary gear set including a plurality of elements rotatable in the housing;
a plurality of engagement mechanisms each switchable between a connection mode in which the elements are connected to each other and a fixed mode in which one of the elements is fixed to the housing;
an output member;
a shift position detecting unit configured to detect a shift position;
an input rotational speed detecting unit configured to detect a rotational speed of the input member;
a control unit configured to receive information regarding the rotational speed detected by the input rotational speed detecting unit and information regarding the shift position detected by the shift position detecting unit and control the engagement mechanisms, the rotational speed of the input member being changed into one of a plurality of speeds, and the rotation of the input member being output from the output member; and
a switching mechanism configured to switch between a reverse rotation prevention mode in which forward rotation of one of the elements representing rotation in a direction to move a vehicle forward is allowed and reverse rotation of the element representing rotation in a direction to move the vehicle backward is prevented and a fixed mode in which the element is fixed to the housing, wherein the control unit sets the switching mechanism in the reverse rotation prevention mode when the shift position is in a forward drive range and sets the switching mechanism in the fixed mode when the shift position is in a reverse drive range, wherein when the shift position is changed from the forward drive range to the reverse drive range, the control unit is capable of performing a reverse preparation mode in which a rotational speed of the element to be fixed by the switching mechanism is lower than or equal to a predetermined speed by setting the engagement mechanism in one of the connection mode and the fixed mode, and wherein upon performing the reverse preparation mode, the control unit engages the engagement mechanism that makes the rotational speed of the input member lower than or equal to the predetermined speed and, thereafter, engages the engagement mechanism that connects the element fixed by the switching mechanism to the input member.

3. An automatic transmission comprising:

an input member disposed in a housing to receive power transferred from a drive source;

a planetary gear set including a plurality of elements rotatable in the housing;

a plurality of engagement mechanisms each to be switched between a connection mode in which the plurality of elements are connected to each other and a fixed mode in which one of the plurality of elements is fixed to the housing;

an output member from which a rotation of the input member being to be output;

a shift position detector configured to detect a shift position;

an input rotational speed detector configured to detect a rotational speed of the input member;

a controller configured to receive information regarding the rotational speed detected by the input rotational speed detector and information regarding the shift position detected by the shift position detector and configured to control the plurality of engagement mechanisms, the rotational speed of the input member being changed into one of a plurality of speeds;

a switching mechanism configured to switch between a reverse rotation prevention mode in which a forward rotation of one of the elements is allowed and a reverse rotation of the one of the elements is prevented and a fixed mode in which the one of the elements is fixed to the housing, the forward rotation representing rotation in a direction to move a vehicle forward, the reverse rotation representing rotation in a direction to move the vehicle backward;

the controller configured to set the switching mechanism in the reverse rotation prevention mode when a shift position is set to a forward drive range and configured to set the switching mechanism in the fixed mode when the shift position is set to a reverse drive range;

the controller being configured to perform a reverse preparation mode in which the rotational speed of the element to be fixed by the switching mechanism is lower than or equal to a predetermined speed by setting the engagement mechanism in one of the connection mode and the fixed mode, when the shift position is changed from the forward drive range to the reverse drive range; and upon performing the reverse preparation mode, the controller being configured to engage the engagement mechanism that connects the element fixed by the switching mechanism to the input member and, thereafter, engage the engagement mechanism that makes the rotational speed of the input member lower than or equal to the predetermined speed.

4. The automatic transmission according to claim 3, wherein when the controller performs the reverse preparation mode, the controller requests the drive source to limit an output torque which is transferred from the drive source.

5. An automatic transmission comprising:

an input member disposed in a housing to receive power transferred from a drive source;

a planetary gear set including a plurality of elements rotatable in the housing;

a plurality of engagement mechanisms each to be switched between a connection mode in which the plurality of elements are connected to each other and a fixed mode in which one of the plurality of elements is fixed to the housing;

an output member from which a rotation of the input member being to be output;

a shift position detector configured to detect a shift position;

an input rotational speed detector configured to detect a rotational speed of the input member;

a controller configured to receive information regarding the rotational speed detected by the input rotational speed detector and information regarding the shift position detected by the shift position detector and configured to control the plurality of engagement mechanisms, the rotational speed of the input member being changed into one of a plurality of speeds;

a switching mechanism configured to switch between a reverse rotation prevention mode in which a forward rotation of one of the elements is allowed and a reverse rotation of the one of the elements is prevented and a fixed mode in which the one of the elements is fixed to the housing, the forward rotation representing rotation in a direction to move a vehicle forward, the reverse rotation representing rotation in a direction to move the vehicle backward;

the controller configured to set the switching mechanism in the reverse rotation prevention mode when the shift position is in a forward drive range and configured to set the switching mechanism in the fixed mode when the shift position is in a reverse drive range;

the controller being configured to perform a reverse preparation mode in which the rotational speed of the element to be fixed by the switching mechanism is lower than or equal to a predetermined speed by setting the engagement mechanism in one of the connection mode and the fixed mode, when the shift position is changed from the forward drive range to the reverse drive range; and upon performing the reverse preparation mode, the controller being configured to engage the engagement mechanism that makes the rotational speed of the input member lower than or equal to the predetermined speed and, thereafter, engage the engagement mechanism that connects the element fixed by the switching mechanism to the input member.

6. The automatic transmission according to claim 5, wherein when the controller performs the reverse preparation mode, the controller requests the drive source to limit an output torque which is transferred from the drive source.

* * * * *